United States Patent
George

(10) Patent No.: US 9,374,468 B2
(45) Date of Patent: Jun. 21, 2016

(54) INBOUND CONTACT CENTER CALL DISCONNECT BUFFER

(71) Applicant: Avaya, Inc., Basking Ridge, NJ (US)

(72) Inventor: Jibin George, Maharashtra (IN)

(73) Assignee: Avaya Inc., Basking Ridge, NJ (US)

( * ) Notice: Subject to any disclaimer, the term of this patent is extended or adjusted under 35 U.S.C. 154(b) by 12 days.

(21) Appl. No.: 14/100,268

(22) Filed: Dec. 9, 2013

(65) Prior Publication Data

US 2015/0163361 A1 Jun. 11, 2015

(51) Int. Cl.
*H04M 3/00* (2006.01)
*H04M 5/00* (2006.01)
*H04M 3/523* (2006.01)

(52) U.S. Cl.
CPC .... *H04M 3/5232* (2013.01); *H04M 2203/2005* (2013.01); *H04M 2203/2088* (2013.01)

(58) Field of Classification Search
CPC . H04M 3/523; H04M 3/5232; H04M 3/5183; H04M 3/5175; H04M 3/5231
USPC ............ 379/265.11, 266.06, 265.14, 266.01, 379/265.05, 265.01; 370/352
See application file for complete search history.

(56) References Cited

U.S. PATENT DOCUMENTS

| | | | |
|---|---|---|---|
| 2004/0032862 A1* | 2/2004 | Schoeneberger et al. ..... | 370/352 |
| 2009/0097635 A1* | 4/2009 | Abuelsaad et al. ...... | 379/266.06 |
| 2010/0296417 A1 | 11/2010 | Steiner | |
| 2011/0038476 A1* | 2/2011 | Anisimov et al. ........ | 379/265.14 |
| 2011/0255683 A1 | 10/2011 | Flockhart | |

* cited by examiner

*Primary Examiner* — Thjuan K Addy
(74) *Attorney, Agent, or Firm* — Sheridan Ross P.C.

(57) ABSTRACT

A contact center is described along with various methods and mechanisms for administering the same. Methods are provided that detect a communications channel loss in a communication between a customer and a resource of a contact center. The method determines when the communications channel loss occurred. When the communications loss occurs prior to an objective of the customer being resolved the method reserves an incoming communication route for the customer to call back and reach the same resource when the call back is made in a predetermined and limited amount of time.

20 Claims, 3 Drawing Sheets

INBOUND CONTACT CENTER CALL DISCONNECT BUFFER

FIELD OF THE DISCLOSURE

The present disclosure is generally directed toward communications and more specifically toward contact centers.

BACKGROUND

Contact centers can provide numerous services to customers, and have been doing so for years. The idea of a contact center queue is not much different from that of standing in line at a bank and waiting to be helped by the next available teller. However, when a customer reaches the teller at a bank it is extremely rare that their communication is dropped in mid-conversation. Unfortunately, dropped communications can be quite common in a contact center context. Dropped communications are especially common in developing, and Third World, countries where a combination of network congestion, poor cellular reception, and an underdeveloped infrastructure contribute to interfering with communications. Whether the call is dropped on the part of the customer or the agent, a dropped communication can be a time consuming and frustrating event.

When communications are dropped in a contact center, a customer may attempt to call back into the contact center system. This call back typically results in the customer being re-queued for handling by an available resource. However, the customer will most likely be matched with a different resource than the resource originally handling the communication before the communication was dropped. A number of factors may contribute to the customer being matched with a different resource including, the size of a contact center, the number of contacts received at a contact center, a status of one or more resources at the contact center, the work requirements of one or more resources, and the like. As can be appreciated, a customer who has to repeat the entire process of queuing, matching, and repeating communications with a new resource may quickly become annoyed and dissatisfied.

Methods have been conceived to attempt to resolve this issue by allowing the resource to contact the customer in the event of a dropped communication. Unfortunately, these methods require that the customer be available when the resource attempts to make contact. Customer availability may be especially erratic when the customer's equipment, network, or provider is responsible for the dropped communication. Moreover, when a resource repeatedly attempts to contact a customer that resource cannot service other work at the contact center, costing time and money. As can be appreciated, the methods do not adequately solve the problem associated with dropped communications.

SUMMARY

It is with respect to the above issues and other problems that the embodiments presented herein were contemplated. In particular, embodiments of the present disclosure provide methods, devices, and systems that allow a customer who experiences a dropped contact center communication to call back into the contact center and reach the same resource that handled the contact prior to the dropped communication. More specifically, when a dropped or lost communication is detected, a call identifier associated with the customer and/or contact is stored at a memory associated with an incoming call routing element of the contact center. Additionally, information relating to the resource handling the contact at the time of the dropped communication may be stored at a memory associated with the routing element. In some embodiments, when the customer calls back into the contact center, the routing element may determine based at least partially on the stored call identifier, and/or the resource information, to route the customer to the resource previously handling the contact.

In some embodiments, the status of the resource may be at least partially reserved to handle the contact in the event that the customer reestablishes contact with the contact center. In one embodiment, the stored call identifier and/or reservation of the resource may be limited to a specific period of time. This time may be stored in a buffer associated with the contact center, the routing element, and/or one or more other components of the contact center. For instance, upon expiration of the time period (e.g., the customer fails to call back within the specified time period, etc.), then at least one of the stored call identifier and the resource reservation may be removed from the memory associated with the routing element.

Embodiments of the present disclosure are directed to reducing customer dissatisfaction in the event that a customer's call is dropped in a communication with an agent of the contact center. Typically, calls are frequently dropped in developing and third world countries where cellular connectivity is not at the best. Additionally or alternatively, these countries may experience more dropped calls due to overly congested communication networks. In one embodiment, a customer call may experience a communication loss (e.g., the call is dropped), in which case the present disclosure can reserve one or more call appearances of the agent handling the call prior to the loss. By way of example, the call appearance of the agent for the same caller line identification (CLI) can be reserved, and if the same customer calls back into the contact center within a buffer time, that call will be directed to the same agent. As such, the same customer and the same agent may continue the communication from where they left off prior to the communication loss.

In some embodiments, the methods disclosed herein may be provisioned on a device having a processor and memory that is associated with a resource. For instance, the methods provided herein may be configured as instructions stored in the memory and executed by the processor of an agent's device. Additionally or alternatively, the agent's device may inform a routing element to reserve a call appearance. In one example, the agent's device may inform a Private Branch Exchange (PBX) for reserving the call appearance for the same CLI. Continuing this example, the PBX may also include the buffer time. The buffer time may define how long a reserved call route is held before it is removed from memory.

At least one aspect of the present disclosure allows a customer calling from the same CLI to be connected to the same agent if after a communication loss, the customer calls back within a predetermined buffer time. In one embodiment, an agent may think that a customer was disconnected suddenly. A selection may exist on the agent's device (e.g., computer, telephone, etc.) to indicate to the routing element (e.g., PBX) to reserve one of the agent's call appearances for a buffer time for the CLI of the customer. In some embodiments, the buffer time may be set by the agent, an administrator, based on rules, and/or the customer. For example, a new entry for the CLI associated with the customer may be created in the incoming call route settings. These settings may include the destination as the agent for the set buffer time. In one embodiment, especially where the contact center system is experiencing high call volumes, the agent may receive call on other call appearances associated with that agent. In the event that the reserved call appearance receives a call back within the buffer time from a customer who previously experienced a communication loss, the agent may handle the customer who called back while transferring any "new" customers associated with the agent's other appearances to one or more different agents. As can be appreciated, it may be easier for the agent to transfer information about the new customer to another agent such that the new customer would not be negatively impacted by the transfer.

In the event that the customer who previously experienced a communication loss does not call back within the set buffer time, any reservation associated with that customer and/or agent may be removed from memory. For example, the reserved call route may be removed from the memory of the routing element. Additionally or alternatively, the reserved call appearance of the agent may be removed from the memory of the agent's device. In any event, the reservations provided herein may be removed automatically from memory upon expiration of a timer and/or the occurrence of a condition associated with the call. One example of a condition may include, but is not limited to, where a dropped customer calls back within the buffer time. In this example, the reserved route may be removed from the routing element upon detecting the received call from the dropped customer.

A goal of contact centers is to increase customer satisfaction while improving overall operating efficiency. As can be appreciated, the embodiments provided herein can increase customer satisfaction and operating efficiency due in part to the decrease in times associated with agents properly answering and assisting customers and properly disposing of each call. Among other things, the customer who experiences a communication loss will be encouraged to call back an agent at a contact center where that customer will not have to start anew with a different agent, re-explain the problem, proceed through a series of menu options again, and the like.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
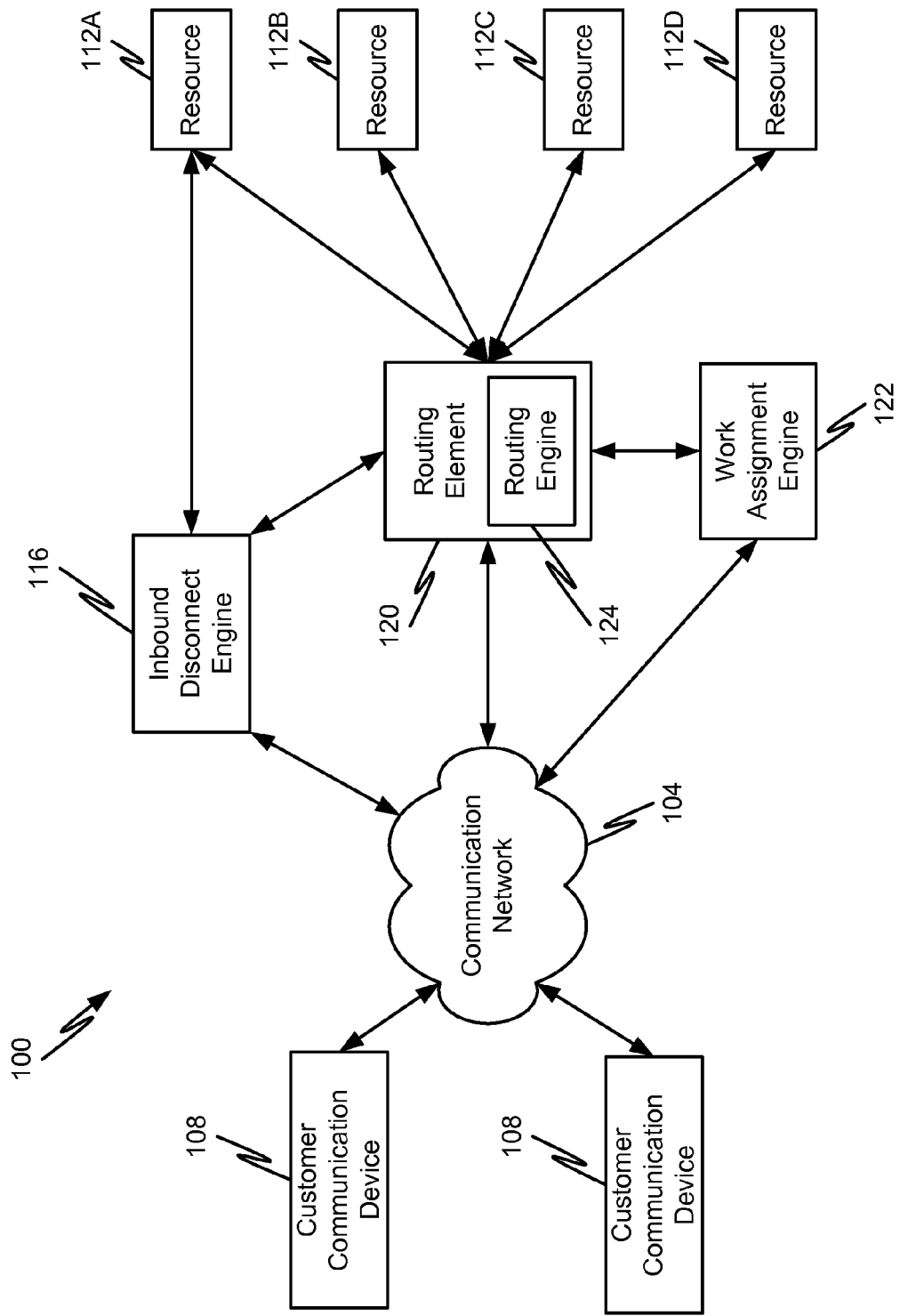
FIG. 1 is a block diagram of a communication system in accordance with embodiments of the present disclosure.

FIG. 1 shows a block diagram of a communication system 100 in accordance with at least some embodiments of the present disclosure. The communication system 100 may be a distributed system and, in some embodiments, comprises a communication network 104 connecting one or more communication devices 108 to a routing element 120, which may be owned and operated by an enterprise administering a contact center in which a plurality of resources 112A-112D are distributed to handle incoming work items (in the form of contacts) from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112A-112D. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof.

The format of the work item may depend upon the capabilities of the communication device 108 and the format of the communication. In some embodiments, work items are logical representations within a contact center of work to be performed in connection with servicing a communication received at the contact center (and more specifically the routing element 120).

The communication associated with a work item may be received and maintained at the routing element 120, a switch or server connected to the routing element 120, or the like until a resource 112A-112D is assigned to the work item representing that communication at which point the routing element 120 routes the communication device 108 which initiated the communication with the assigned resource 112A-112D. In some embodiments, the routing engine 124 may send a notification to one or more resources 112A-112D before the routing element 120 routes the work item.

Although the routing engine 124 is depicted as being incorporated into the routing element 120, the routing engine 124 may be located separately from the routing element 120 or its functionality may be executed another separate server of the contact center, the inbound disconnect engine 116, or other processor.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112A-112D via the combined efforts of the routing element 120 and routing engine 124.

The resources 112A-112D can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the routing element 120 and resources 112A-112D may be owned and operated by a common entity in a contact center format. One example of a routing element 120 may include but is in no way limited to, a Private Branch Exchange (PBX). In some embodiments, the routing element 120 may be administered by multiple enterprises, each of which has their own dedicated resources 112A-112D connected to the routing element 120.

In some embodiments, the routing element 120 comprises a work assignment engine 122 which enables a work assignment mechanism, or routing element 120, to make intelligent routing decisions for work items. In some embodiments, the work assignment engine 122 is configured to administer and make work assignment decisions in a queueless contact center, as is described in U.S. patent application Ser. No. 12/882,950, the entire contents of which are hereby incorporated herein by reference.

More specifically, the work assignment engine 122 can determine which of the plurality of processing resources 112A-112D is eligible and/or qualified to receive a work item and further determine which of the plurality of processing resources 112A-112D is best suited to handle the processing needs of the work item. In situations of work item surplus, the work assignment engine 122 can also make the opposite determination (i.e., determine optimal assignment of a work item to a resource). In some embodiments, the work assignment engine 122 is configured to achieve true one-to-one matching.

The work assignment engine 122 may reside in the routing element 120 or in a number of different servers or processing devices. In some embodiments, cloud-based computing architectures can be employed whereby one or more components of the routing element 120 (e.g., the work assignment engine 122, etc.) are made available in a cloud or network such that they can be shared resources among a plurality of different users.

The inbound disconnect engine 116 may be configured as instructions stored in a memory and executed by a processor of the contact center. In some embodiments, the inbound disconnect engine 116 may perform a number of the methods provided herein. For instance, the inbound disconnect engine 116 may detect a communications loss, determine that the loss occurred prior to addressing an objective, reserve an incoming communication route associated with a customer, and/or provide instructions to the routing element 120 to route certain communications. Although the inbound disconnect engine 116 is depicted as being separate from the resources 112A-112D and the routing element 120, the inbound disconnect engine 116 may be incorporated with at least one of the resources 112A-112D, the routing element 120, and the routing engine 124. Additionally or alternatively, the inbound disconnect engine 116 or its functionality may be executed another server and/or processor of the contact center.

Figure 2:
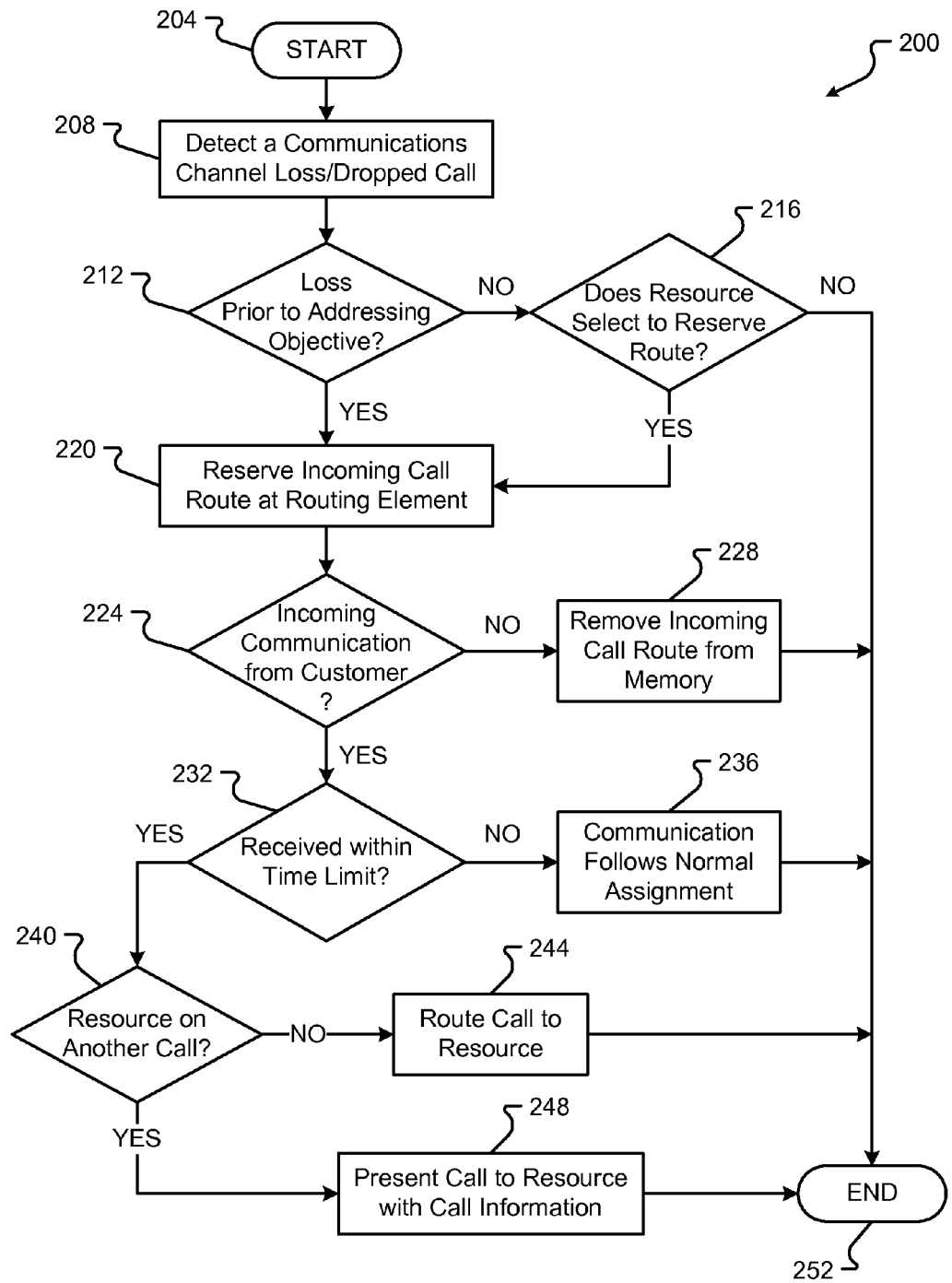
FIG. 2 is a flow diagram depicting a method of detecting a communications channel loss and determining to reserve a communications route in accordance with embodiments of the present disclosure.

Referring now to FIG. 2, a flow diagram is provided in accordance with embodiments of the present disclosure depicting a method 200 of detecting a communications channel loss and determining to reserve a communications route. The method 200 begins at step 204 when a communication exists between a customer communication device 108 and a resource 112A. For example, the communication may include a telephone call between a customer and an agent of a contact center. Continuing this example, the customer may have been routed to the resource 112A via one or more routing elements 120, IVRs, work assignment engines 122, and/or other contact center components. In any event, the customer and resource 112A may be contact with one another over at least one communications channel.

The method 200 proceeds when a communications channel loss is detected (step 208). A communications channel loss may include any interruption in communications service that terminates the communications connection between two or more entities. One example of a communications channel loss is a dropped telephone call, where the telephone connection between a caller and a callee is terminated such that communications are ceased between endpoints of the call. Other examples of communication channel losses may include, but are in no way limited to, one or more of, cut communication lines, inadvertent hang-ups, emergency breakthroughs, a removed necessary communications element in a communication channel's path, electrical disconnections, mechanical device failures, and the like. The terms dropped call, communication channel loss, communication disconnection, communication loss, combinations thereof, and the like, may be used interchangeably as provided herein.

In some embodiments, the resource 112A may detect that the communications channel disconnected. For example, a resource 112A may be in the middle of a conversation and detect that the customer has not responded. In another example, the resource 112A may determine that during a conversation/communication with a customer the customer's communication was cutoff abruptly.

In one embodiment, a dropped call or communications channel loss may be detected automatically. For instance, a device associated with the resource 112A may determine that the device is no longer receiving a signal from a customer communication device 108. In one embodiment, the device may make the determination that the communications channel loss occurred by receiving at least one of a dial tone, busy signal, ringback tone, disconnect tone, off-hook tone, and other tone used to indicate the communications channel has been disconnected, or lost. In some cases, the detection of communications loss may be made by a device after being presented with a disconnect signal from at least one of a switch, routing element, PBX, and the like.

The automatic detection of a communications channel loss may incorporate the use of speech-analytics to determine at least one of a conversational dynamic, a mid-sentence cutoff, a voice frequency, a recurring speech pattern, and more. By way of example, a customer may be in the middle of explaining an issue to a resource 112A when the customer experiences a dropped call in mid-sentence. Based on conversational patterns from the recorded speech-analytics, the communications drop may detect the fact that the customer was cutoff in mid-sentence and did not stop speaking abruptly. The speech-analytics may be used by one or more of a resource's device, a processor associated with the contact center, the routing element 120, and other component of the contact center.

It should be understood that the speech-analytics may be used alone or coupled with any other communications channel loss detection means as provided herein. In a coupled example, the speech-analytics may determine a difference between a hang-up and a dropped call. For instance, a device may determine that a customer was disconnected but the disconnection was not accompanied with any mid-sentence cutoff or other recognized speech-analytics condition. In this case, the customer may have intentionally hung-up the phone. Alternatively, if the customer was disconnected and a recognized speech-analytics condition (e.g., cutoff in mid-sentence, asking a question, responding to a question, etc.) is detected, the customer may have experienced a dropped call. As can be appreciated, the methods provided herein may be applied to a resource in lieu of a customer. As such, the methods disclosed herein can be used to detect a dropped call or communications channel loss on the customer side, the resource side, combinations thereof, and elsewhere in a communications channel path.

In some embodiments, the method 200 may proceed by determining whether the communications channel loss occurred prior to addressing at least one objective (step 212). The at least one objective may be an objective provided by the customer, resource, contact center, contact center administrator, etc. By way of example, while a customer is connected to a contact center, the customer may provide any number of objectives based on queries, voluntary elections, selections, IVR responses, and the like. These objectives may be recorded and/or associated with the call or other communication between the customer and the resource 112A. In some cases, the at least one objective may be determined automatically or manually. An automatic detection of objectives may be based on recorded communications between a customer and the resource 112A-112D. Objectives can include, but are not limited to, customer questions (e.g., issues the customer wishes to resolve, open questions, etc.), agent questions, quality metrics (e.g., agent goals, surveys, resolution questions, etc.), provided assistance (e.g., query and response used in a communication, procedural steps, etc.), and more.

Where at least one objective is provided, the method 200 may determine that the communication between the customer (e.g., via the customer communication device 108) and a resource 112A-112D was disconnected prior to addressing the at least one objective (step 208). In some cases, this determination may be made by referring to a recorded objective associated with a work item. In one embodiment, this determination may be made using speech-analytics to detect whether the at least one objective was addressed, resolved, and/or otherwise disposed of. For instance, a customer may provide the following statement "that solved my problem," which can be interpreted, using speech-analytics, as implying the objective was addressed. Conversely, a customer may state, "that did not solve my problem," which may be interpreted, using speech-analytics, that the objective was not addressed. As can be appreciated variations in statements made by a customer and/or resource 112A can contribute to making an appropriate determination of whether an objective was addressed.

Additionally or alternatively, a resource 112A-112D may record when an objective is addressed. In some cases this recordation may be provided by a resource 112A-112D selecting a resolved, completed, and/or other indicator that the objective was addressed. This selection may be made via a device associated with the resource 112A-112D and stored in a memory. In one embodiment, the customer may provide an input via the customer communication device 108 to indicate that an objective was addressed. For instance the customer may select a number on a keypad associated with a phone to provide the input. This input may indicate that an objective was partially addressed, fully addressed, resolved, satisfactorily resolved, etc.

In the event that communication channel loss did not occur prior to addressing the at least one objective (e.g., the loss occurred after addressing the at least one objective), the resource 112 may provide an input to reserve an incoming call route at the routing element 120 (step 216). By way of example, the resource 112 may wish to determine whether the customer has any further questions, objectives, or issues. Additionally or alternatively, the resource 112 may wish to formally conclude the communication and may even wish to receive some other input from the customer. In any event, the input to reserve an incoming call may be provided by a resource 112A via a device associated with the resource 112A. For example, the resource 112A may provide the input by selecting an option associated with a graphical user interface of the device. This resource 112A provided selection may then be communicated to the routing element 120 and/or the inbound disconnect engine 116. If provided to the inbound disconnect engine 116, the selection may be provided to the routing element 120 via the inbound disconnect engine 116. If the resource 112A does not select to reserve the incoming call route, the method 200 ends at step 252.

Whether a resource 112A selects to reserve an incoming call route or the communications channel loss is determined to occur prior to addressing at least one objective, the method 200 continues by reserving an incoming communication route (step 220). In some embodiments, the reserved incoming communication route may be associated with the disconnected customer. For instance, the disconnected customer may have an identification (e.g., Caller Line Identification (CLI), Media Access Control (MAC) address, Internet Protocol (IP) address, and the like) that can be used to identify the disconnected customer.

Additionally, the reserved incoming communication route may include a destination. The destination may correspond to an address, phone number, and/or extension of the resource 112A who was assigned to the disconnected customer prior to the communications loss. Among other things, the destination may be used by the routing element 120 to route an incoming communication from the disconnected customer to the resource 112A of the contact center.

As provided in some embodiments herein, the reserved incoming communication route may only be available for a specific amount of time. In one embodiment, the reservation of a communication route may expire after a specific amount of time has passed. This amount of time may correspond to a timer that begins at the same time, or after, the communications loss occurs. Upon expiration of the timer the communication route may be removed from memory. In other words, upon expiration of the timer, the reserved communication route is no longer reserved. The timer may be included at the routing element 120 or as part of the reservation.

The reservation of the incoming communication route associated with the disconnected customer may include one or more of the customer identifier, the resource address, and the timer. Once created, the reserved incoming communication route may be provided to a memory of the routing element 120, where it is stored.

The method 200 continues by determining whether an incoming communication is received at the contact center from the previously disconnected customer associated with the reserved communication route (step 224). In some embodiments, the previously disconnected customer may be identified by the previously disconnected customer's number, CLI, address, customer communication device 108, and/or other identifier associated with the reserved incoming communication route. For example, a PBX may be used by a contact center to receive and direct calls. In this example, the reserved incoming communication route may be stored in a memory associated with the PBX. When a call is received by the PBX, the PBX may refer to the memory to determine if any reserved incoming communication route exists. If so, the PBX may direct a call received from the previously disconnected customer to the agent designated in that route. If an incoming communication is not received from the disconnect customer, the method 200 proceeds to remove the incoming communication route from memory (step 228) and ends at step 252.

In the event that an incoming communication is received from the previously disconnected customer, the method 200 proceeds by determining whether the incoming communication was received within the specified time limit (step 232). In some embodiments, the specified time limit may be associated with the reserved incoming communication route and may be set by a resource 112A-112D. In one embodiment, the time limit may be set by an administrator of the contact center and/or routing element 120. In any event, the time limit may be stored in a memory associated with the routing element 120.

Continuing the PBX example provided above, where a call is received from the previously disconnected customer outside of the specified time limit, the PBX may refer to the memory only to find that the reserved communication route has been removed. As can be appreciated, if the communication is not made within the time limit, the previously disconnected customer must follow the standard routing to any resource 112A-112D of the contact center, as directed by the routing element 120 (step 236). For example, the previously disconnected customer may have to pass through multiple IVRs, queues, work assignments, and/or other routing elements to reach a resource 112A-112D. In this case, the previously disconnected customer may not be paired with the same resource 112A who was assigned to the customer prior to the disconnection and the method 200 ends at step 252.

However, if the incoming communication from the previously disconnected customer is received within the time period, the method 200 continues by determining whether the resource 112A associated with the previously disconnected customer is on another call, or otherwise engaged (step 240). In some cases, the resource 112A may continue to work and handle new communications or calls with other customers while waiting for the disconnected customer to call back. In some embodiments, a resource 112A may utilize have one or more appearances that represent work items and/or communications from customers. The appearances may be associated with a graphical user interface of a device. It is anticipated that when an incoming communication route is reserved, at least one appearance may be held open on the graphical user interface of the resource's 112A device in accordance with embodiments of the present disclosure. For example, this appearance may be held open on the device until one of the timer associated with the reserved incoming communication route expires or the disconnected customer calls back within the specific time period. In some embodiments, the held open appearance may alert the resource 112A when an incoming communication is received from a previously disconnected customer.

In the event that the resource 112A is determined to be on another call, the method 200 continues by presenting the communication received from the previously disconnected customer to the resource 112A (step 248). In some embodiments, the resource 112A may transfer any other assigned work items to another resource 112B-112D or agent of the contact center. In one embodiment, the resource 112A may continue to handle the assigned work items while handling the communication received from the previously disconnected customer. For instance, when the other assigned work items are text-based, web-based, or the like, the resource 112A may choose to continue handling the other assigned work items while assisting the previously disconnected customer via phone or voice. The method 200 ends at step 252.

If the resource 112A is determined not to be on another call, and/or handling other work items in step 240, the method 200 continues by routing the incoming communication from the previously disconnected customer to the resource 112A (step 244). In other words, the incoming communication is routed to the resource 112A via the routing element 120 and in accordance with routing instructions stored in a memory of the routing element 120. The method 200 ends at step 252.

In some embodiments, and prior to the method 200 ending, the previously disconnected customer may experience another communications loss. It should be appreciated that the method 200 may then repeat at step 208 by detecting the communications loss.

Figure 3:
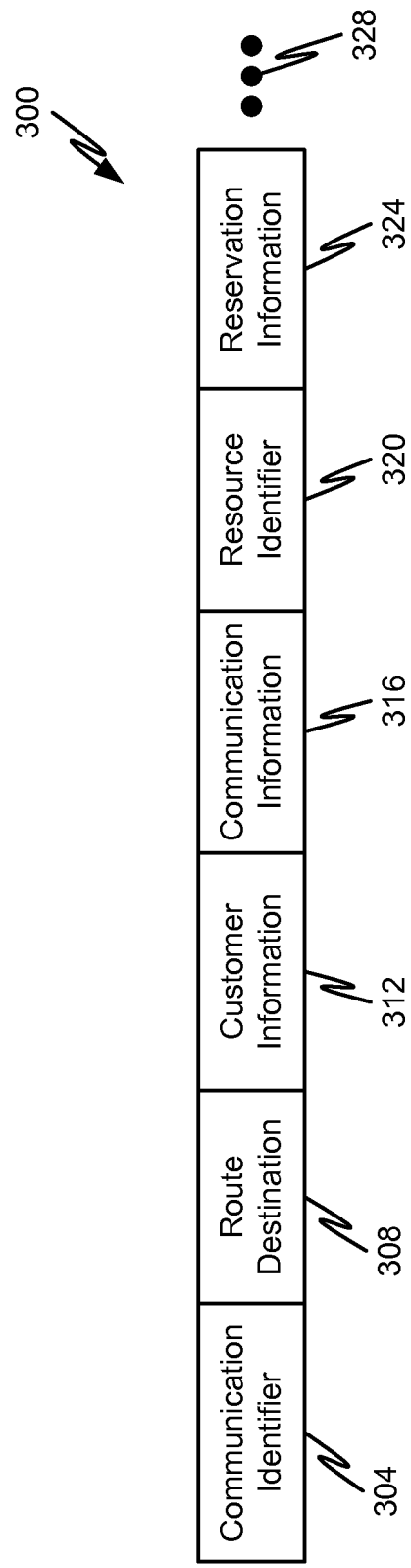
FIG. 3 is a block diagram depicting a data structure used in accordance with embodiments of the present disclosure.

FIG. 3 is a block diagram depicting a data structure 300 used in accordance with embodiments of the present disclosure and which may be created, stored, and/or maintained by the inbound disconnect engine 116. Specifically, each reserved incoming communication route, may have a corresponding data structure 300 which identifies the communication in a communication identifier field 304, provides routing information and related data in a route destination field 308, identifies the customer associated with the communication in a customer information field 312, provides information relating to the communication in a communication information field 316, specifies the resource 112A handling the communication at the time of communication loss in a resource identifier field 320, includes reservation associated information in a reservation information field 324, and may include additional fields 328 for other data as provided herein.

The communication identifier field 304 may comprise data that identifies the communication from another communication, such as a CLI number, telephone number. This field 304 may be used by the routing element 120 in determining when an incoming communication is received from a particular customer. The communication identifier field 304 may be used to alert a resource 112A of a previously disconnected customer who has called back the contact center to reinitiate communications with the resource 112A. Among other things the communication identifier field 304 may comprise data that can be used to differentiate between various work items received by a call center.

The route destination field 308 may comprise data that identifies how the communication should be routed in a contact center. In some cases, the route destination field 308 may include the resource 112A address, extension, name, and/or location. As can be appreciated, this field 308 may be used by the routing element 120 to direct the received incoming communication associated with the previously disconnected customer to the resource 112A who was previously assigned to the customer before the customer was disconnected.

The customer information field 312 may comprise data that identifies a customer associated with the communication. In some embodiments, the customer information field 312 may comprise one or more bits which describe whether the customer associated with the communication has paid for, or is assigned to, a quality level or grade. Among other things, the field 312 may include a history that is associated with the customer. For example, the field 312 may include, how many times the customer has contacted the contact center, the times associated with each call, averages of call times, the time length of calls, and more. In some cases, the customer information field 312 may include the customer's name, a customer communication device 108 identification associated with the customer, and the like. Additionally, or alternatively, the customer information field 312 may include data relating to a specific customer that may be used by the routing element 120 in referring to stored data, preferences, and/or historical information relating to the customer.

The communication information field 316 may comprise data that is associated with the customer's communication prior to being disconnected. In one embodiment, this field 316 may include the topic of the call, nature of the assistance required if any, and other recorded information relative to the communication. Additionally or alternatively, the communication information field 316 may include data relating to the communications loss/disconnection. For instance, the field 316 may record one or more of when the communications loss occurred, how long the communication has been disconnected, and the like. In some embodiments, the communication information field 316 may include data corresponding to at least one objective associated with the communication. For example, the objective information included in this field 316 may include, but is not limited to, a type of objective, an objective description, whether the objective was addressed, resolved, remains unresolved, was not addressed, combinations thereof, and the like.

In some embodiments, the communication information field 316 may include a priority associated with a service grade. Among other things, the field 316 may be used to prioritize the communication (and subsequently received communications) based on a service grade (e.g., increasing in grade from lowest to highest, such as, bronze, silver, gold, platinum, etc.) and the like. For example, a communication may be treated differently in routing if it is determined that the customer associated with the communication has paid for the best service levels (e.g., either gold or platinum) available. In other words, the priority of the above example may be set higher than other communications. This priority may cause other work items to be automatically transferred from a resource's 112A workload when the previously disconnected customer calls back. This information may be contained in the communication information field 316.

The resource identifier field 320 may comprise data that identifies a resource associated with the disconnected communication. In some embodiments, the resource identifier field 312 may comprise one or more bits which describe the resource's 112A communications address, or destination. For example, the field 320 may include a telephone number, extension, name, IP address, and even information associated with a device used by the resource 112A. Additionally, or alternatively, the resource identifier field 320 may include data relating to resource 112A that may be used by the routing element 120 in referring to availability, workload, and/or location in a contact center of the resource 112A. In some cases, the field 320 may include a skill level associated with the resource 112A.

The reservation information field 324 may comprise data that can be used in determining the parameters surrounding an incoming communication route reservation. In some embodiments, this field 324 may include a specific time limit that can be used to hold open the reservation for the specific time limit. Additionally or alternatively, the specific time limit may be used by a memory associated with the routing element 120 to store the reservation. It is anticipated that upon the expiration of the specified time limit, the reservation can be removed from the memory associated with the routing element 120. In some embodiments, the reservation information field 324 may include information relating to the time the incoming communication route reservation was made. This time may be used by the various components disclosed herein to establish the buffer time to hold the reservation open. Among other things, the time may be used to determine when to remove the reservation from memory.

It should be appreciated that while embodiments of the present disclosure have been described in connection with a queueless contact center architecture, embodiments of the present disclosure are not so limited. In particular, those skilled in the contact center arts will appreciate that some or all of the concepts described herein may be utilized in a queue-based contact center or any other traditional contact center architecture.

Furthermore, in the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
   detecting, by a processor, a communications channel loss in a communication between a customer and a resource of a contact center;
   determining, by the processor, that the communications channel loss occurred prior to the resource addressing at least one objective of the customer; and
   in response to determining that the communications channel loss occurred prior to the resource addressing the at least one objective of the customer, reserving, by the processor at a memory associated with a routing element of the contact center, an incoming communication route for the customer, wherein the reserved incoming communication route is configured to provide instructions to the routing element such that a second communication from the customer routes to the resource via the reserved incoming communication route.

2. The method of claim 1, wherein the routing element of the contact center is a private branch exchange (PBX) having a switch and a processor and wherein the second communication is a call with the customer.

3. The method of claim 1, further comprising:
   receiving, at the contact center, the second communication from the customer;
   referring, via the routing element, to the reserved incoming communication route associated with the customer; and
   routing the customer to the resource.

4. The method of claim 1, wherein the reserved incoming communication route is stored in the memory for a predetermined period of time.

5. The method of claim 4, wherein the reserved incoming communication route is removed from the memory upon an expiration of the predetermined period of time.

6. The method of claim 1, wherein prior to determining that the communications channel loss occurred prior to the resource addressing the at least one objective, the method further comprises:
   monitoring an exchange of information in the communication between the customer and the resource; and recording at least one metric associated with the exchange of information associated with each of the customer and the resource.

7. The method of claim 6, wherein determining that the communications channel loss occurred prior to the resource addressing the at least one objective, further comprises:
  referring to the recorded at least one metric associated with the exchange of information; and
  determining that the recorded at least one metric matches stored data indicating that the at least one objective of the customer was not addressed.

8. The method of claim 1, wherein the reserved incoming communication route further comprises:
  a call identifier associated with the customer; and
  a destination identifier associated with the resource.

9. The method of claim 8, wherein the call identifier associated with the customer includes at least one of a phone number, email address, instant messaging handle, Internet protocol (IP) address, Media Access Control (MAC) address, and communication device address.

10. A non-transitory computer readable medium having stored thereon instructions that, when executed by a processor, perform a method comprising:
  detecting a communications channel loss in a communication between a customer and a resource of a contact center;
  determining that the communications channel loss occurred prior to the resource addressing at least one objective of the customer; and
  in response to determining that the communications channel loss occurred prior to the resource addressing the at least one objective of the customer, reserving, at a memory associated with a routing element of the contact center, an incoming communication route for the customer, wherein the reserved incoming communication route provides instructions to the routing element such that a second communication from the customer routes to the resource via the reserved incoming communication route.

11. The non-transitory computer readable medium of claim 10, wherein the method further comprises:
  receiving, at the contact center, the second communication from the customer;
  referring, via the routing element, to the reserved incoming communication route associated with the customer; and
  routing the customer to the resource.

12. The non-transitory computer readable medium of claim 10, wherein the reserved incoming communication route is stored in the memory for a predetermined period of time.

13. The non-transitory computer readable medium of claim 12, wherein the reserved incoming communication route is removed from the memory upon an expiration of the predetermined period of time.

14. The non-transitory computer readable medium of claim 10, wherein prior to determining that the communications channel loss occurred prior to the resource addressing the at least one objective, the method further comprises:
  monitoring an exchange of information in the communication between the customer and the resource; and
  recording at least one metric associated with the exchange of information associated with each of the customer and the resource.

15. The non-transitory computer readable medium of claim 14, wherein determining that the communications channel loss occurred prior to the resource addressing the at least one objective, further comprises:
  referring to the recorded at least one metric associated with the exchange of information; and
  determining that the recorded at least one metric matches stored data indicating that the at least one objective of the customer was not addressed.

16. The non-transitory computer readable medium of claim 10, wherein the reserved incoming communication route further comprises:
  a call identifier associated with the customer; and
  a destination identifier associated with the resource.

17. The non-transitory computer readable medium of claim 16, wherein the call identifier associated with the customer includes at least one of a phone number, email address, instant messaging handle, Internet protocol (IP) address, Media Access Control (MAC) address, and communication device address.

18. A contact center, comprising:
  a memory;
  a processor;
  a routing element that routes a customer initiated communication to a resource of the contact center; and
  an inbound disconnect engine that detects a communications channel loss in a communication between the customer and the resource of the contact center, determines that the communications channel loss occurred prior to the resource addressing at least one objective of the customer, and in response to determining that the communications channel loss occurred prior to the resource addressing the at least one objective of the customer, reserves, at the memory, an incoming communication route for the customer, wherein the reserved incoming communication route provides instructions to the routing element such that a second communication from the customer routes to the resource via the reserved incoming communication route.

19. The contact center of claim 18, wherein the routing element further comprises a buffer, and wherein the reserved incoming communication route is stored in the buffer for a predetermined period of time.

20. The method of claim 1, wherein the contact center is a queueless contact center, further comprising:
  reserving, in response to determining that the communications channel loss occurred prior to the resource addressing the at least one objective of the customer, a call appearance of the resource for the customer; and
  transferring, in response to receiving the second communication from the customer, at least one other customer associated with the resource to one or more other resources of the contact center.

* * * * *